Oct. 28, 1930.    R. G. ANDERSON    1,780,105
FLEXIBLE COUPLING
Filed Oct. 29, 1927    3 Sheets-Sheet 1

Inventor
Robert G. Anderson,
by
His Attorney

Oct. 28, 1930.    R. G. ANDERSON    1,780,105
FLEXIBLE COUPLING
Filed Oct. 29, 1927    3 Sheets-Sheet 2

Inventor
Robert G. Anderson,
by *Alexander S. Lunt*
His Attorney.

Inventor:
Robert G. Anderson,
by *Alexander S. ...*
His Attorney.

Patented Oct. 28, 1930

1,780,105

UNITED STATES PATENT OFFICE

ROBERT G. ANDERSON, OF COLONIE, NEW YORK, ASSIGNOR TO GENERAL ELECTRIC COMPANY, A CORPORATION OF NEW YORK

FLEXIBLE COUPLING

Application filed October 29, 1927, Serial No. 229,748, and in Great Britain June 11, 1927.

My invention relates to flexible couplings and has for its object the provision of a simplified and improved construction for coupling two rotatable elements in such manner that their axes can be displaced relative to each other without impairing the effectiveness of the driving connection between them. I do this by rotatably supporting a member on one of the rotatable elements and providing links directly connected to the member forming a driving connection with the other rotatable element, the connection between the links and the other rotatable element being maintained at a fixed distance from the axis of rotation of the latter. Such an arrangement simplifies the coupling structure, and when it is used to couple a rotatable driving element spring borne on the axle of a locomotive or car to the driving wheels makes possible an arrangement of most of the bearings of the coupling outside of the wheels of the locomotive or car, which facilitates the inspection and care of the coupling bearings, and also minimizes the clearance required between the driving gear and the wheels.

My invention will be more fully set forth in the following description referring to the accompanying drawings and the features of novelty which characterize my invention will be pointed out with particularity in the claims annexed to and forming a part of this specification.

Figure 1:
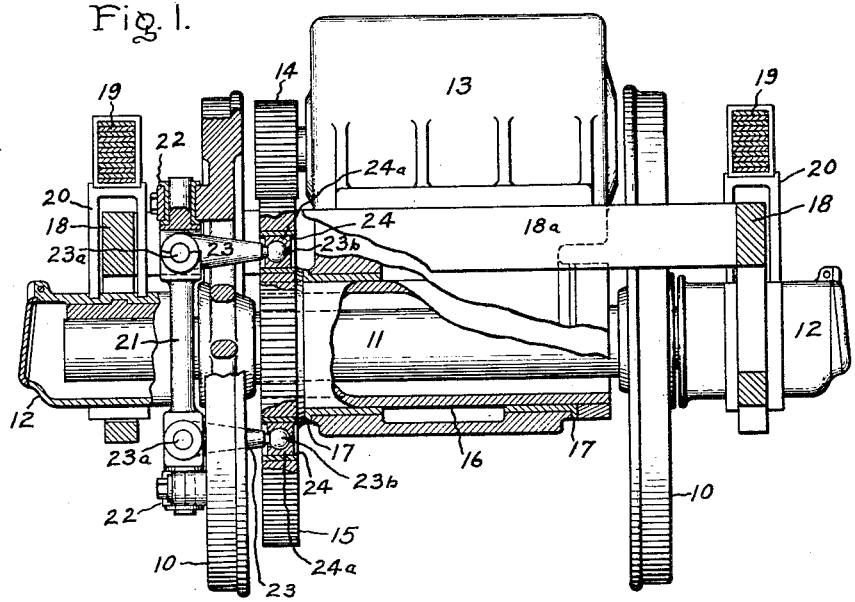
Figure 2:
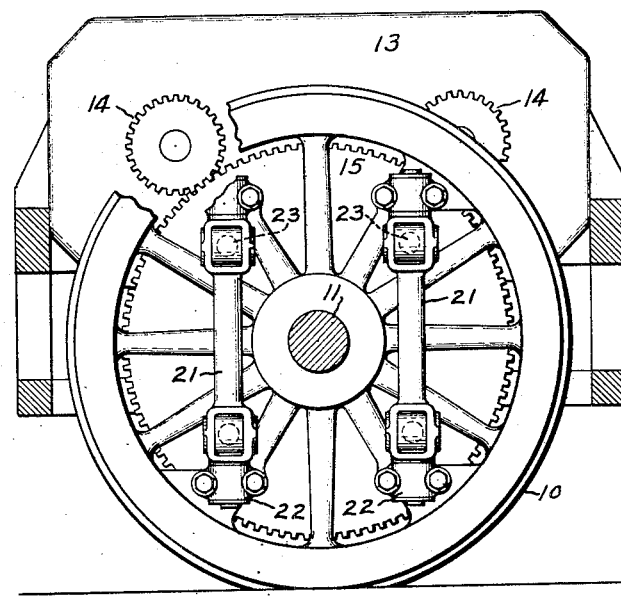
Figure 3:
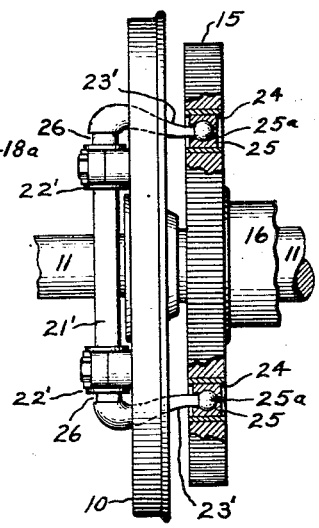
Figure 4:
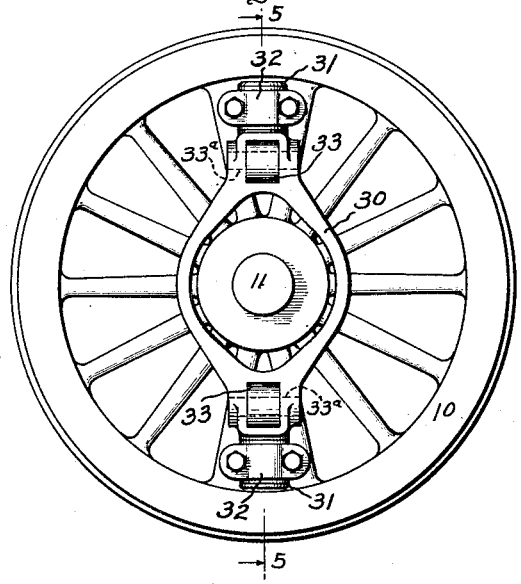
Figure 5:
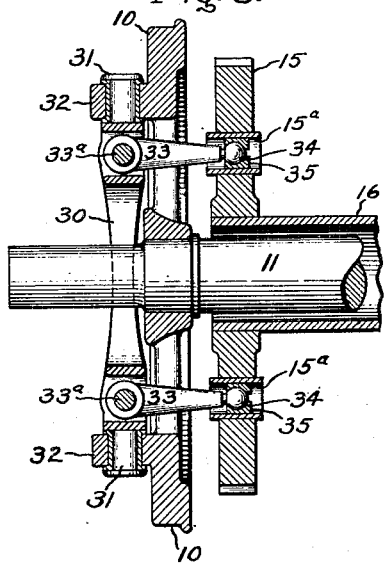
Figure 6:
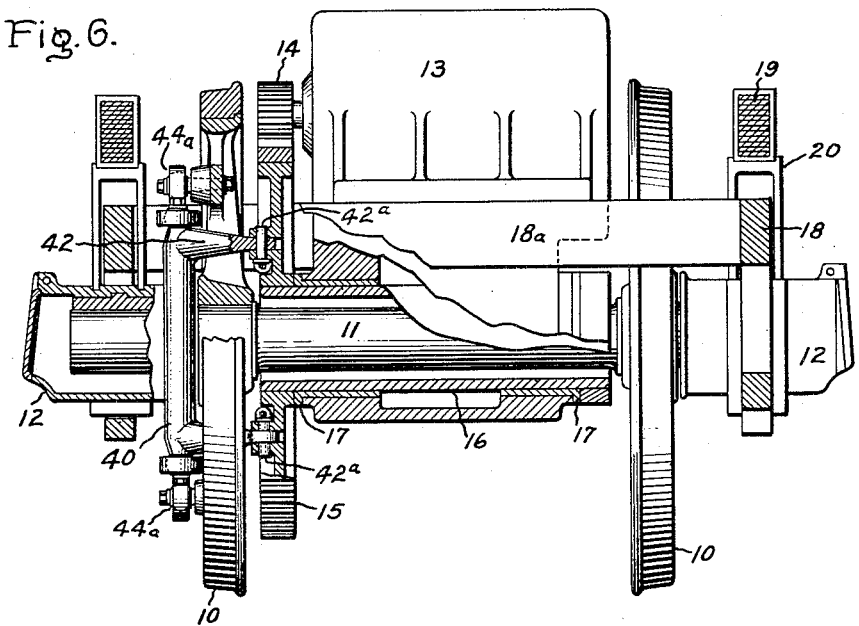
Figure 7:
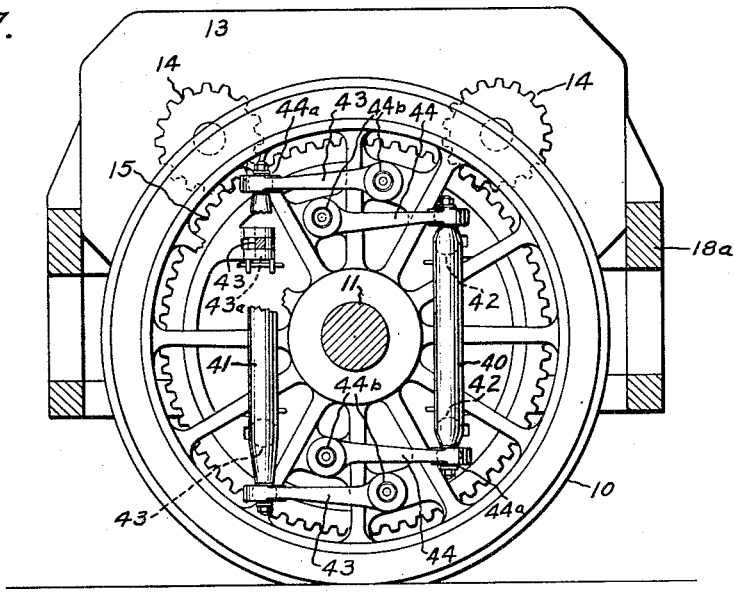

As illustrated in the drawing, Fig. 1 is a transverse section of a locomotive or car embodying my invention, partly broken away to more clearly show the construction; Fig. 2 is a side elevation of the structure shown in Fig. 1 with the spring suspension system and the frame broken away; Fig. 3 is a view similar to Fig. 1 showing a slight modification of the coupling between a driving gear and a driving wheel; Fig. 4 is an elevation of another modification of my coupling applied between a driving wheel and a driving gear of a locomotive or car; Fig. 5 is a sectional view approximately on the line 5—5 of Fig. 4; Fig. 6 is a transverse section of a locomotive or a car embodying a further modification of my improved coupling, and Fig. 7 is a side elevation of the structure shown in Fig. 6 in which the spring suspension system and the frame is broken away.

In the drawing I have shown my improved flexible coupling arranged to connect the driving gear of a locomotive or car to the driving wheels thereof, and in order to more clearly set forth the nature and scope of my invention several modifications of this application of my invention have been illustrated.

The preferred form of my invention illustrated in Figs. 1 and 2 is shown in connection with a locomotive or car comprising driving wheels 10 secured to the axle 11 in the usual manner and journal boxes 12 for supporting the main frame of the locomotive on the axle 11. The locomotive is driven by any suitable means such as a twin motor 13 having pinions 14 engaging a driving gear 15 secured to a quill shaft 16, which surrounds the axle 11, and which is carried by bearings 17 extending from the frame of the motor. The motor, gear and quill shaft constitute a unitary structure in which the motor pinions 14 are maintained in proper alignment with the driving gear 15, and in order to minimize the dead weight carried by the axle 11 this structure is supported on the main frame 18 of the locomotive by cross ties 18ª. The main frame is supported on the axle 11 by springs 19 secured at each end thereof to the frame by links (not shown), the springs being supported on saddles 20 extending on each side of the frame and resting on the journal boxes 12. By this arrangement the locomotive frame with the unitary structure including the motor 13 and driving gear 15 will move up and down or sway on the springs and move relative to the driving wheels and axle when the locomotive or car passes over irregularities or curves in the tracks. In order to provide a coupling between the driving gear 15 and driving wheel 10 which will not interfere with the flexibility of the spring suspension system of the locomotive, I rotatably secure a plurality of members 21 in bearings 22 secured to the driving wheel so that the axes of rotation of these members extend transversely of the axle 11. Links 23 are pivotally connected at 23ª on the members 21 for movement about an axis extending transversely and preferably radially thereof. The links 23 extend between the spokes of the driving wheel 10 and into openings 24 formed in the driving gear 15 so as to form a driving connection therewith. The openings 24 are arranged in the gear 15 so that the links 23 remain parallel upon movement of the gear relative to the driving wheel, and extend parallel to the axis of the gear so that forces transmitted from the gear to the links 23 will not produce any forces tending to change the relative position of the gear and the driving wheel. The necessary universal flexibility between the links 23 and the driving gear 15 is obtained by forming balls 23ᵇ on the links 23 which are seated in sockets formed in cylindrical bearing members 24ª arranged in the openings 24 so that the wearing surfaces are adequate for the torque transmitted.

In the position of the driving wheel shown in Figs. 1 and 2 when the driving gear 15 is moved up and down vertically upon movement of the frame relative to the axle, which is the path of movement to which it is substantially restricted by the spring suspension system of the locomotive, the links are swung about their pivotal supports 23ª and the balls 23ᵇ turn about an axis parallel to the pivotal supports 23ª, the bearing member 24ª moving slightly in the opening 24 toward the driving wheel as the angularity of the links shorten the horizontal distance between the pivotal supports 23ª and the balls 23ᵇ. If the driving wheel should be turned 90 degrees from the position in which it is illustrated in Figs. 1 and 2 upon vertical up and down movement of the gear 15 relative to the driving wheel the member 21 would turn in the bearings 22, the angularity of the links causing a slight movement of the bearing member 24ª in the opening 24 toward the driving wheel. In this position of the driving wheel the movement of the gear 15 relative to the driving wheel 10 would not cause any turning of the links 23 on their pivotal supports 23ª. In any position intermediate the position illustrated in Figs. 1 and 2 and the position at 90 degrees relative thereto, vertical up and down movement of the gear relative to the driving wheel would cause turning of the member 21 in its bearings 22 and turning of the links 23 on their pivotal supports 23ª, the bearing member 24ª moving slightly in the opening 24 toward the driving wheel because of the angular movement of the links 23.

In this construction when torque is transmitted from the gear 15 to the driving wheel 10 through the links 23 and members 21, the forces exerted by the gear on the links 23 are transverse to the axis of rotation of the member 21 because the links 23 are pivoted on the member 21 for movement about the axes 23ª extending transversely thereof, so that the only resisting forces exerted by the links on the gear act in a direction transversely of the members 21 and not in a direction longitudinally thereof. It is apparent that the links 23 resist the forces exerted thereon by the gear in a direction transversely of the axis of rotation of the members 21 in all positions of the gear 15 relative to the driving wheel. It will thus be seen that torque is transmitted from the gear 15 to the driving wheel 10 by a force couple which acts transversely of the bearings 22, and which does not produce any end thrust of the member 21 in its bearings for any position of the gear relative to the wheel. Moreover the force couple applied to the links 23 subject the member 21 to a torsional stress between the pivotal supports 23ª of the links 23 which gives the coupling a desirable resiliency and tends to prevent shocks being transmitted from the driving wheel to the driving gear as they are absorbed in the member 21 by its angular deflection under torsional stress due to the force couple.

In the modification of my invention shown in Fig. 3 torque is transmitted from the driving gear 15 to the driving wheel 10 by a shaft 21' which is supported in bearings 22' on the driving wheel and which is provided with integral links 23' connected by ball and socket joints 25ª in bearing members 25 which are arranged in cylindrical openings 24 in the driving gear. The links 23' are spaced slightly from the bearings, as shown at 26, so that upon vertical movement of the driving gear in the position illustrated in Fig. 3 the shaft 21' reciprocates longitudinally in the bearings 22'. If the gear is rotated 90 degrees from the position shown in Fig. 3 vertical up and down movement relative to the axle 11 will cause the shaft 21' to turn in the bearings 22' and cause the bearing members 25 to move slightly in the openings 24 toward the driving wheel 10 as the angularity of the fixed links 23' decreases the distance between the axis of the shaft 21' and the bearing members 25. In positions intermediate that illustrated in Fig. 3 and a position 90 degrees relative thereto, vertical movement of the driving gear 15 causes longitudinal movement of the member 21' in the bearings 22' and angular movement of the fixed links 23'. In this construction torque is transmitted from the driving gear 15 to the driving wheel by a force couple, each of the forces of which act on the bearing members 25 in a direction transversely of the axis of the member 21' because the fixed links 23' and the member 21' offer no resistance to any other forces.

Although in Figs. 1 and 2 I have shown two members 21 secured to the driving wheel 10 and arranged substantially parallel it is apparent that each of these members with its links 23 transmit torque from the driving gear to the driving wheel independently of the other so that one such member may be used if the torque to be transmitted is not too great, or in case of very heavy torque more than two may be used. In Figs. 4 and 5 I have illustrated a driving gear and driving wheel which are coupled together by a single member similar to the members 21 illustrated in Figs. 1 and 2, it being understood that the driving gear and quill shaft are spring supported from the locomotive frame on journal boxes arranged on the axle 11 substantially as shown in Figs. 1 and 2. In order to obtain the maximum lever arm for the forced couple acting on the wheel through the bearings and to obtain a balanced construction relative to the axis of rotation of the driving wheel it is preferred to arrange this member on a diameter of the wheel. In this construction, which is intended to be applied to a locomotive or car similar to that shown in Figs. 1 and 2, torque is transmitted from the driving gear 15 to the driving wheel 10 by a coupling comprising a yoke 30 which is rotatably supported on the driving wheel by trunnions 31 formed thereon arranged in bearings 32 on the driving wheel and arranged so that the axes of the trunnions 31 are on the same diameter of the wheel. The coupling also comprises parallel links 33 which are pivotally connected at 33ª to the yoke 30 and extend into cylindrical openings 15ª which are arranged with their axes parallel to the axis of rotation of the gear. The necessary universal flexibility between links 33 and the gear 15 is provided by balls 34 formed on the links which are socketed in bearing members 35 arranged in the openings 15ª. In the position of the wheel illustrated in Figs. 4 and 5 if the gear 15 is moved vertically relative to the axle 11 the links will move about their pivotal supports 33ª without turning the yoke 30 in the bearings 32. If the driving wheel is rotated 90 degrees from the position shown vertical movement of the gear relative to the wheel would cause the yoke 30 to turn in the bearings 32 without moving the links 33 about their pivotal supports. Any movement of the gear 15 relative to the driving wheel causes the balls 34 to be moved out of horizontal alignment with the pivotal supports 33ª which causes the bearing members 35 to be moved slightly in the openings toward the driving wheel. In transmitting torque from the driving gear to the driving wheel forces acting on the balls 34 act in a direction transversely of the yoke 30 and transmit a couple to the yoke and from thence to the driving wheel through the bearings 32 without producing any forces which tend to cause axial movement of the trunnions 31 in the bearings 32, as the links offer no resistance to movement of the gear along the axis of the trunnions.

I have illustrated a further modification of my invention in Figs. 6 and 7 in connection with a locomotive or car of the same construction as that shown in Figs. 1 and 2. In this form of my invention torque is transmitted from the driving gear to the driving wheel by a coupling comprising members 40 and 41, the member 40 being provided with links 42 formed integrally therewith and extending between the spokes of the driving wheel adjacent the driving gear to which it is pivotally connected at 42ª. The member 41 is also provided with links 43 formed integrally therewith extending between the spokes of the driving wheel adjacent the driving gear to which they are pivotally connected at 43ª. The members 40 and 41 are connected to the driving wheel by links 44 which are secured to the ends of the members 40 and 41 by ball and socket joints 44ª and to the driving wheel by ball and socket joints 44ᵇ, which permit the members 40 and 41 to turn about their longitudinal axes or move longitudinally thereof. If the driving gear is moved vertically up and down when the driving wheel is in the position shown in Figs. 6 and 7, the members 40 and 41 will move therewith and cause the links 44 to turn about the ball and socket joints 44ª and 44ᵇ assuming a position at an angle to the axes of the members 40 and 41, at the same time causing the links 42 and 43 to turn the members 40 and 41 respectively slightly in the ball and socket joints 44ª to compensate for the shortening of the distance between the axes of the members 40 and 41 from the line of centers of the ball and socket joints 44ᵇ parallel therewith. When the driving wheel is moved 90 degrees from the position illustrated in Figs. 6 and 7, upon vertical movement of the driving gear 15 the links 42 and 43 turn about their pivotal connections 42ª and 43ª on the driving gear, the links 44 moving about the ball and socket joints 44ᵇ away from the driving wheel sufficiently to compensate for the shortening of the distance between the axes of the members 40 and 41 and the end of the driving gear caused by the angular movement of the links 42 and 43 relative to the latter.

In transmitting torque from the driving gear to the driving wheel the forces acting on the links 42 and 43 are at right angles to the axes thereof. These forces act in this direction because the members 40 and 41 are pivotally supported on the driving wheel so that they offer no resistance to the forces acting longitudinally of the axes of the members 40 and 41. For this reason there are no forces produced, tending to change the position of the driving gear relative to the driving wheel, when torque is being transmitted in any position of the gear within the range of vertical movement to which it is substantially restricted, as in the other constructions, by the spring suspension system. In the above described form of my improved coupling the portion of the member 40 between the links 42 and the portion of the member 41 between the links 43 are both subjected to a torsional stress by the moment of the forced couple acting on the pivotal connection between the links 42 and 43 and the driving wheel. This gives the coupling a resiliency which minimizes the transmission of shock from the driving wheel to the driving gear, as in the other forms of my improved coupling described.

I have illustrated my improved coupling in connection with a locomotive or car, but it is apparent that it may be used in any other connection where a flexible coupling is desirable. Moreover modifications of the various forms of my invention, which I have illustrated and described will occur to those skilled in the art. I desire it to be understood therefore that my invention is not to be limited to the particular arrangements disclosed, and I intend in the appended claims to cover all modifications which do not depart from the spirit and scope of my invention.

What I claim as new and desire to secure by Letters Patent of the United States, is,—

1. A flexible coupling comprising two rotatable elements, a member rotatably secured to one of said elements, a plurality of links directly connected to said member and extending substantially axially of said rotatable elements, and means for connecting said links to the other of said rotatable elements so as to form a driving connection therewith, said connecting means being maintained at a fixed distance from the axis of rotation of said last mentioned rotatable element.

2. A flexible coupling comprising two rotatable elements, a member rotatably supported on one of said elements and arranged with its axis of rotation extending transversely of the axis of rotation of said one element, a plurality of links directly connected to said member, said links extending longitudinally of the axis of rotation of said one element, and means for connecting said links to the other of said rotatable elements, said connecting means being maintained at a fixed distance from the axis of rotation of said last mentioned rotatable element.

3. A flexible coupling comprising a rotatable element having a member rotatably supported thereon with the axis of rotation of the latter extending transversely of the former, another rotatable element having openings therein, a plurality of links pivotally connected to said member for movement about axes arranged transversely thereof, said links extending into the openings in said last mentioned rotatable element so as to form a driving connection therewith.

4. In a locomotive or car having an axle and wheels thereon, a frame spring borne on said axle, driving means for said wheels including a rotatable driving element carried by said frame, a flexible coupling for transmitting torque from said driving element to said axle comprising a member rotatably secured to said axle, a plurality of links directly connected to said member and extending substantially axially of said axle, and means for connecting said links to said driving element, said connecting means being maintained at a fixed distance from the axis of rotation of said driving element.

5. In a locomotive or car having an axle with wheels thereon, a frame spring borne on said axle, driving means for said wheels including a rotatable driving element carried by said frame, a flexible coupling for transmitting torque from said driving element to said wheels comprising a member rotatably secured to said axle transversely thereof, a plurality of links carried by said member, said links extending longitudinally of said axle, and means for connecting said links to said driving element, said connecting means being maintained at a fixed distance from the axis of rotation of said driving element.

6. In a locomotive or car having an axle with wheels thereon, a frame spring borne on said axle, driving means for said wheels including a rotatable driving element carried by said frame, said driving element having axially extending openings therein, a flexible coupling for transmitting torque from said driving element to said wheels comprising a member rotatably mounted on one of said driving wheels, a plurality of links carried by said member, and extending into the openings in said driving element so as to form a driving connection therewith.

7. In a locomotive or car having an axle with wheels thereon, a frame spring borne on said axle, driving means for said wheels including a rotatable driving element carried by said frame, said driving element having axially extending openings therein, a flexible coupling for transmitting torque from said driving element to said axle comprising a member rotatably mounted on one of said driving wheels transversely of said axle and a plurality of links pivotally connected to said member for movement about an axis extending transversely of said member, said links extending into the openings in said driving element so as to form a driving connection therewith.

8. In a locomotive or car having an axle with wheels thereon, a frame spring borne on said axle, driving means for said wheels including a rotatable driving element carried by said frame, said driving element surrounding said axle between said wheels substantially co-axial with said axle and having a plurality of axially extending openings, one of said openings extending centrally through said driving element and being larger than said axle for permitting displacement of the axis of said driving element relative to said axle upon movement of said frame relative to the latter, a member rotatably mounted on one of said wheels transversely of said axle, and a plurality of links carried by said member and extending into openings in said driving element so as to form a driving connection therewith.

9. In a locomotive or car having an axle with wheels thereon, a frame spring borne on said axle, driving means for said wheels including a rotatable driving element carried by said frame, said driving element surrounding said axle between said wheels substantially co-axial with said axle and having a plurality of axially extending openings, one of said openings extending centrally through said driving element and being larger than said axle for permitting displacement of the axis of said driving element relative to said axle upon movement of said frame relative to the latter, a member rotatably mounted on one of said wheels on the side thereof opposite said driving element, said member being arranged transversely of said axle, and a plurality of links pivotally connected to said member for movement about an axis transversely thereof, said links extending through the wheel on which it is mounted and into openings in said driving element so as to form a driving connection therewith.

In witness whereof, I have hereunto set my hand this 28th day of October, 1927.

ROBERT G. ANDERSON.